United States Patent
Wörsdorfer et al.

[11] Patent Number: 6,135,572
[45] Date of Patent: Oct. 24, 2000

[54] ACTUATION UNIT FOR AN ELECTRONICALLY CONTROLLED VEHICLE BRAKE SYSTEM

[75] Inventors: Karl-Friedrich Wörsdorfer, Budenheim; Gregor Poertzgen, Koblenz; Andrew Kingston, Heidesheim; Thomas Weigert, Bad Soden, all of Germany

[73] Assignees: Varity GmbH, Koblenz, Germany; Lucas Industries plc, Solihull, United Kingdom

[21] Appl. No.: 09/272,185

[22] Filed: Mar. 18, 1999

Related U.S. Application Data

[63] Continuation of application No. PCT/EP97/04666, Aug. 27, 1997, which is a continuation-in-part of application No. 08/813,146, Mar. 7, 1997, Pat. No. 5,941,608
[60] Provisional application No. 60/038,043, Mar. 6, 1997, provisional application No. 60/032,595, Dec. 2, 1996, and provisional application No. 60/018,814, May 31, 1996.

[30] Foreign Application Priority Data

Sep. 18, 1996 [DE] Germany .............. 196 38 102

[51] Int. Cl.$^7$ .................................................. B60T 13/16
[52] U.S. Cl. ................................ 303/10; 303/901
[58] Field of Search ............ 303/1, 114.1, 114.3, 303/119.1, 87, 113.1, 2, 116.1, 24.1, 122, 19, 10, 11, DIG. 11, 115.4, 115.5, 900, 901

[56] References Cited

U.S. PATENT DOCUMENTS

| | | |
|---|---|---|
| 4,462,642 | 7/1984 | Leiber . |
| 4,812,777 | 3/1989 | Shirai . |
| 5,123,713 | 6/1992 | Steiner . |
| 5,230,549 | 7/1993 | Osada et al. . |
| 5,261,730 | 11/1993 | Steiner et al. . |
| 5,312,172 | 5/1994 | Takeuchi . |
| 5,544,948 | 8/1996 | Schmidt et al. . |
| 5,558,409 | 9/1996 | Walenty et al. . |
| 5,567,021 | 10/1996 | Gaillard . |
| 5,588,718 | 12/1996 | Winner et al. . |
| 5,613,740 | 3/1997 | Kawamoto et al. . |
| 5,836,659 | 11/1998 | Fiegel et al. ............... 303/115.2 |
| 5,927,831 | 7/1999 | Bauer et al. ................. 303/1 |
| 5,941,608 | 8/1999 | Campau et al. ............ 303/113.4 |

FOREIGN PATENT DOCUMENTS

| | | |
|---|---|---|
| 0 360 013 B1 | 3/1990 | European Pat. Off. . |
| 31 24 755 A1 | 1/1983 | Germany . |
| 31 31 856 A1 | 2/1983 | Germany . |
| 43 04 565 A1 | 8/1994 | Germany . |
| 43 43 386 A1 | 6/1995 | Germany . |
| 4413579 | 10/1995 | Germany . |

OTHER PUBLICATIONS

"Electrohydraulic Brake System—The First Approach to Brake–By–Wire Technology" by Jonner et al., SAE Technical Paper Series #960991, copyright 1996 Society of Automotive Engineers, Inc.

"Intelligent Braking for Current and Future Vehicles" by Schenk et al., SAE Technical Paper Series #950762, copyright 1995 Society of Automotive Engineers, Inc.

Primary Examiner—Robert J. Oberleitner
Assistant Examiner—Melanie Talavera
Attorney, Agent, or Firm—MacMillan, Sobanski & Todd, LLC

[57] ABSTRACT

An actuation unit for an electronically controlled hydraulic vehicle braking system, comprising a brake booster which can be actuated by a brake pedal and which comprises a master cylinder and a reservoir for hydraulic fluid, a first brake which is coupled with at least a first vehicle wheel and which is connectable with the master cylinder via an electronically controlled valve arrangement in a basic position or, in an actuation position is disconnectable from same, a brake pedal behaviour simulator which is connectable with the master cylinder and comprises a spring arrangement adapted to act against the hydraulic pressure from the master cylinder, and with which a characteristics modeling is associated.

22 Claims, 2 Drawing Sheets

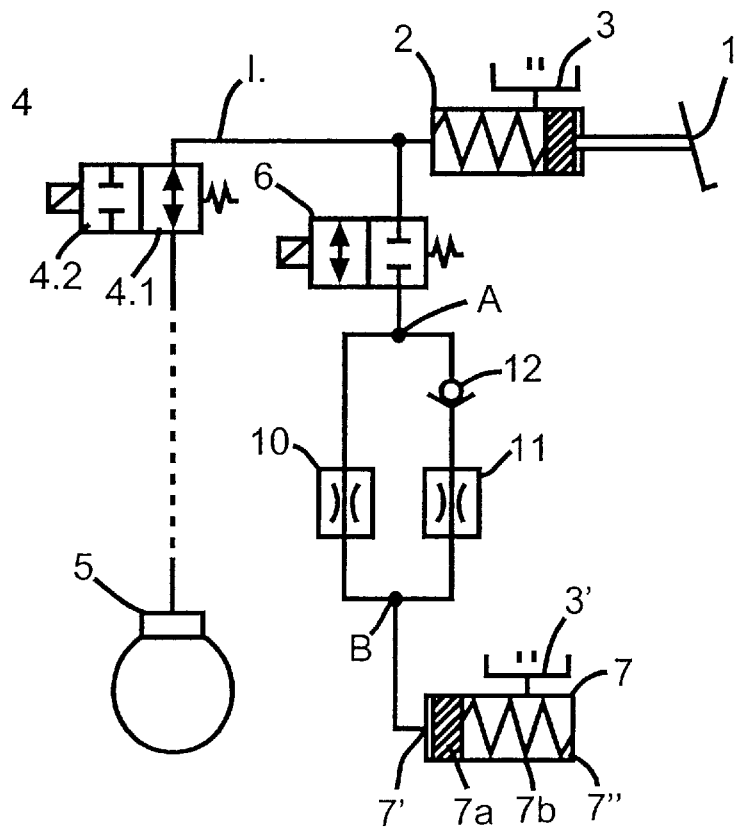
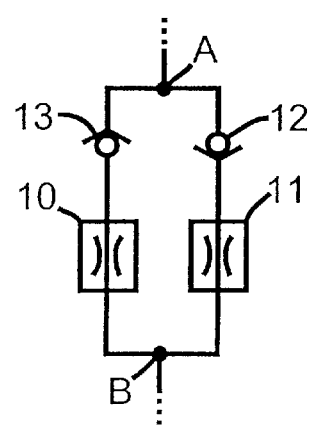
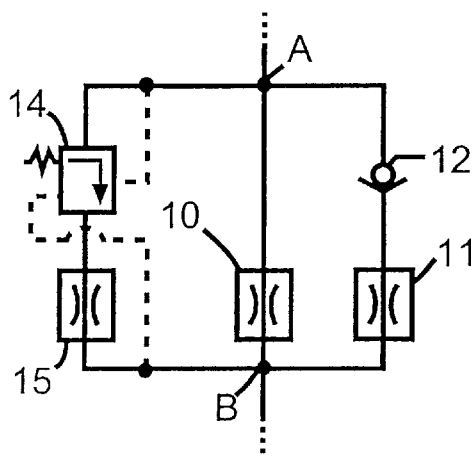
FIG.1
FIG. 2
FIG. 3

ACTUATION UNIT FOR AN ELECTRONICALLY CONTROLLED VEHICLE BRAKE SYSTEM

CROSS-REFERENCE TO RELATED APPLICATIONS

This application is a continuation of copending International Application No. PCT/EP97/04666 filed on Aug. 27, 1997 and which designated the U.S., and claims priority to German Patent Application No. 196 38 102.9, filed Sep. 18, 1996. This application is a continuation-in-part of U.S. patent application No. 08/813,146, Mar. 7, 1997 now U.S. Pat. No. 5,941,608, and claims priority to U.S. provisional application No. 60/038,043, filed Mar. 6, 1997; Ser. No. 60/032,595, filed Dec. 2, 1996; and No. 60/018,814, filed May 31, 1996.

BACKGROUND OF THE INVENTION

The invention relates to an actuation unit for an electronically controlled hydraulic vehicle braking system with a brake booster which can be actuated by a brake pedal and which comprises a master cylinder and a reservoir for hydraulic fluid, with a first brake means which is coupled with, at least, a first vehicle wheel and which is connectable with the master cylinder via an electronically controlled valve arrangement in a basic position or, in an actuation position, is disconnectable from same, with a means for the simulation of the brake pedal behaviour, which is connectable with the master cylinder and which comprises a spring arrangement adapted to act against the hydraulic pressure from the master cylinder.

Such an arrangement is preferably used for so-called brake by-wire vehicle braking systems, wherein an electronically controlled pressure source (not explained in detail herein) builds up, holds and/or relieves the hydraulic pressure in the wheel brakes.

Such vehicle braking systems are, for example, known from DE 31 24 755 A1 or from DE 31 31 865 A1, respectively. These arrangements are, however, disadvantageous in that the brake pedal feeling, as it presents itself to the driver, and the behaviour of the brake pedal, as it is perceivable by the driver, only inadequately correspond to those of conventional vehicle braking systems.

The invention is therefore based on the object to avoid this drawback. To this end, the vehicle braking system according to the invention is developed in such a manner that a characteristics modeling means is associated with the spring arrangement.

The characteristics modeling means can also be arranged in the connection between the master cylinder and the means for simulating the brake pedal behaviour.

Alternatively, the characteristics modeling means can also be arranged in the connection between the means for simulating the brake pedal behaviour and a hydraulic reservoir.

In order to not unnecessarily supply the hydraulic pressure which can be provided by the master cylinder into the simulation means in the case of the first above described embodiment, a second valve arrangement can advantageously be arranged in the connection from the master cylinder to the means for simulating the brake pedal behaviour, by means of which the means for simulating the brake pedal behaviour can be disconnected from the master cylinder in a basic position or connected with same in an actuation position.

This applies analogously for the second above described alternative, wherein a second valve arrangement is preferably arranged in the connection from the means for simulating the brake pedal behaviour to the reservoir, by means of which the means for simulating the brake pedal behaviour can be disconnected from the reservoir in a basic position or connected with same in an actuation position.

In a presently preferred embodiment of the invention the means for simulating the brake pedal behaviour is formed by a cylinder/piston arrangement, wherein a piston is loaded by the spring arrangement which is formed as a helical spring or a diaphragm spring pack with a preferably progressive spring characteristic. Alternatively, the spring arrangement can also be formed by an elastomeric element, which as such is known from DE 43 43 386 A1.

The behaviour of the simulation means can be influenced by means of the characteristics modeling means depending on the direction of movement, the actuation force, and/or the actuation speed of the brake pedal.

To this end, the characteristics modeling means comprises at least one first throttle orifice which forwards hydraulic fluid upon the actuation of the brake pedal and one second throttle which forwards hydraulic fluid upon release of the actuation of the brake pedal. One check valve each is arranged upstream or downstream of the first and/or the second throttle.

In another embodiment of the invention a third throttle is connected in parallel with the first throttle which forwards hydraulic fluid upon the actuation of the brake pedal, with a pressure-controlled differential pressure valve being arranged upstream or downstream of same.

Further advantages, characteristics and properties of the invention will become apparent from the following description of the drawing.

BRIEF DESCRIPTION OF THE SEVERAL VIEWS OF THE DRAWING

FIG. 1 shows a first embodiment of an actuation unit according to the invention for an electronically controlled hydraulic vehicle braking system in a schematic presentation.

FIG. 2 shows a first modification of the characteristics modeling means which is associated with the means for simulating the brake pedal behaviour from FIG. 1.

FIG. 3 shows a second modification of the characteristics modeling means which is associated with the means for simulating the brake pedal behaviour from FIG. 1.

DETAILED DESCRIPTION OF THE INVENTION

Figure 4:
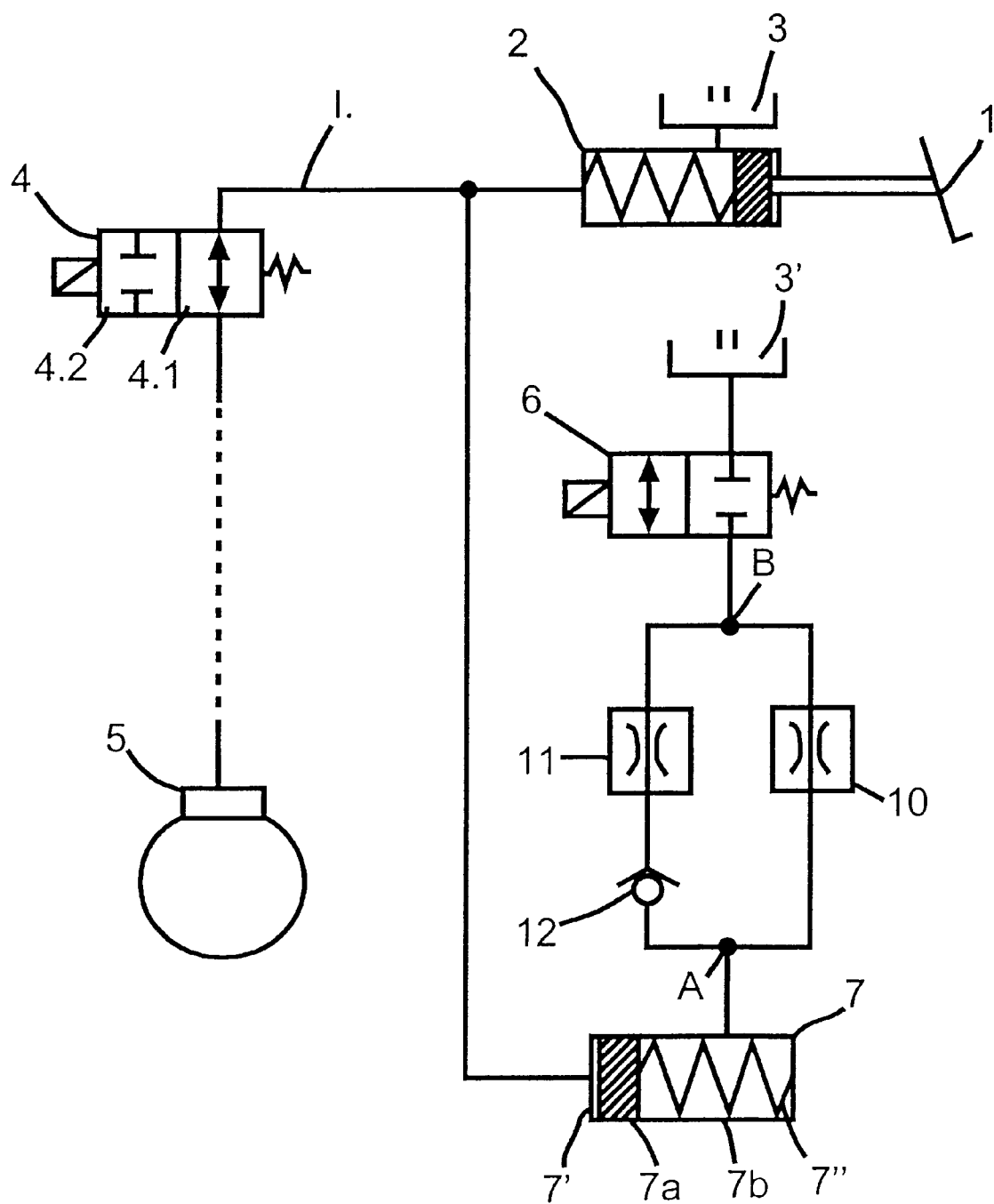
FIG. 4 shows a second embodiment of an actuation unit according to the invention for an electronically controlled hydraulic vehicle braking system in a schematic presentation.

FIG. 1 is an actuation unit according to the invention for an electronically controlled braking system in a schematic presentation. The actuation unit comprises a master cylinder 2 which can be actuated via a brake pedal 1. A brake circuit I extends from the master cylinder 2 in order to supply a wheel brake 5 with hydraulic fluid from a reservoir 3. Usually, two brake circuits with two wheel brakes each are controlled by the master cylinder 2. For the sake of clarity, however, only one brake circuit with one wheel brake 5 is illustrated. A first valve means 4 is arranged between the master cylinder 1 and the wheel brake 5, which opens the connection between the master cylinder 2 and the wheel brake 5 in a spring-assisted manner (basic position) and blocks same in an electromagnetically operated manner (actuation position).

With a faultless electronically controlled braking system the first valve means 4 assumes its actuation position so that the supply of the wheel brake 5 with hydraulic fluid is effected by an electronically controlled pressure source which is not shown in detail. If, however, a fault occurs in the electronically controlled system, for example, by too low a supply voltage, the first valve arrangement 4 returns to its basic position, in order to enable an emergency actuation of the wheel brake 5.

Parallel to the first valve arrangement 4 and the wheel brake 5, the outlet of the master cylinder 2 is connected with a simulation means 7. The simulation means 7 serves to convey the pedal characteristics which are typical of a conventional braking system to the driver upon actuation of the brake pedal 1, if the first valve means 4 is in its actuation position, i.e. if the supply of the wheel brake 5 with hydraulic fluid is effected by the electronically controlled pressure source which is not shown in detail.

A second valve means 6 is arranged in the connection between the outlet of the master cylinder 2 and the simulation means 7, which blocks the connection between the master cylinder 2 and the simulation means 7 in a spring-assisted manner (basic position) and opens same in an electromagnetically operated manner (actuation position). It is thereby possible during the execution of an emergency actuation of the wheel brake 5 to block the connection of the master cylinder 2 to the simulation means 7 so that no hydraulic fluid volume can escape into the simulation means 7. The second valve arrangement 6 changes to its basic position if the first valve means 4, too, is in its basic position, i.e. if a fault (for example voltage decrease) has occurred in the electronically controlled system.

The simulation means 7 has a piston 7a which divides a cylinder into two pressure chambers 7', 7". The pressure chamber 7" is connected with the reservoir 3' for hydraulic fluid. The reservoir 3' can be identical to the reservoir 3 of the master cylinder 2 or can be connected hydraulically with same. The other pressure chamber 7' is connected with the master cylinder 2 via a characteristics modeling means between points A and B as well as the second valve arrangement 6 (being in its actuation position) in order to subject the piston 7a to pressure against the action of a spring element 7b. Preferably, the spring element 7b comprises a progressive spring characteristic in order to simulate the pedal characteristics as accurately as possible.

The spring element 7b can be formed in a conventional manner as a helical spring or a diaphragm spring pack. It is, however, also possible to form the spring element 7b as an elastomeric element, which results in quite considerable cost benefits because, contrary to the use of a helical spring, fastening and abutment parts can be integrated directly into the elastomeric element. In addition, the effort which is required when using a helical spring for guidance and adjustment of the biasing force of the helical spring will be saved. In addition, it is found to be advantageous that an elastomeric element has more distinctive damping properties compared to a helical spring. The advantageous properties of the elastomeric element can be achieved by suitable shaping, encapsulation and material selection.

In order to further model and thus optimise the simulation of the pedal characteristics by hydraulic damping, a first and a second throttle 10, 11 are arranged in the connection between the master cylinder 2 and the simulation means 7. The throttles 10, 11 are arranged between the points A, B and connected in parallel to one another, with a shut-off (check) deck valve 12 being connected in series with the second throttle 11. The shut-off valve 12 is oriented in such a manner that a flow connection is possible only in the direction from the simulation means 7 to the master cylinder 2. Therefore, hydraulic fluid will flow from the master cylinder 2 via the first throttle 10 into the simulation means 7 upon an actuation of the brake pedal 1, while hydraulic fluid will return from the simulation means 7 via both throttles 10, 11 into the master cylinder 2 upon release of the actuation of the brake pedal 1.

According to the invention, different damping and, thus, pedal characteristics will be obtained depending on an actuation of the brake pedal 1 and on release of the actuation of the brake pedal 1.

The throttles 10, 11 are dimensioned or adjustable in such a manner that upon an actuation of the brake pedal 1 pedal characteristics with a higher degree of damping are obtained than upon release of the actuation of the brake pedal 1. The dimensioning of the throttles 10, 11 can be effected in the usual manner by adjusting the flow cross-sections. In order to achieve a higher degree of damping upon an actuation than upon release of the actuation of the brake pedal 1, either the flow cross-sections of the throttles 10, 11 must be set identical to one another, or the flow cross-section of the second throttle 11 which is connected in series with the shut-off valve 12 must be adjusted larger than the flow cross-section of the first throttle 10.

If the spring element 7b of the simulation means 7 already provides for a sufficient damping, which is the case in particular when using an elastomeric element as the spring element 7b, then the throttle valve 11 which is connected in series with the shut-off valve 12 can be omitted.

In the embodiment according to FIG. 2 as compared to the embodiment according to FIG. 1, a shut-off (check) valve 13 is additionally connected in series with the first throttle 10, with the shut-off valve 13 being oriented in such a manner that a flow connection is possible only in the direction from the master cylinder 2 to the pressure chamber 7' of the simulation means 7. Therefore, hydraulic fluid will flow from the master cylinder 2 via the first throttle 10 into the simulation means 7 upon an actuation of the brake pedal 1. Upon release of the actuation of the brake pedal 1 hydraulic fluid will return from the first pressure chamber 7' of the simulation means 7 via the second throttle 11 into the master cylinder 2. In this case, the flow cross-section of the second throttle 11, which is connected in series with the shut-off valve 12, is larger than the flow cross-section of the first throttle 11, which is connected in series with the shut-off valve 13. It is thereby achieved that a higher degree of damping is obtained upon an actuation of the brake pedal 1 than upon release of the actuation of the brake pedal 1.

In the embodiment according to FIG. 3 as compared to the embodiment according to FIG. 1, another throttle 15 is connected in parallel with the throttles 10, 11, with a differential pressure valve 14 with a closed basic position being connected in series with said third throttle 15. In this case, hydraulic fluid from the master cylinder 2 will flow via the throttle 10 into the simulation means 7 upon an actuation of the brake pedal 1. As soon as the pressure difference between the master cylinder 2 and the simulation means 7 exceeds a preset opening pressure difference, the hydraulic fluid flows from the master cylinder 2 via the second and the third throttle 10, 15 into the simulation means 7. Upon release of the actuation of the brake pedal 1, hydraulic fluid returns from the simulation means 7 into the master cylinder 2 via the first and second throttle 10, 11.

Due to the fact that the pressure difference between the master cylinder 2 and the simulation means 7 is related to the actuation force applied to the brake pedal 1, the damping characteristics are thereby adjusted as a function of the actuation force. The pressure difference between the master cylinder 2 and the simulation means 7 depends on the volume flow through the first throttle 10, with the differential pressure valve 14 being in its closed basic position. The volume flow is also related to the actuation speed of the brake pedal 1. The adjustment of the damping characteristics are therefore also dependent on the actuation speed. In summary, the damping characteristics upon the actuation of the brake pedal 1 can be adjusted for the exact simulation of the pedal characteristics by adjusting the opening pressure difference of the differential pressure valve 14, as well as by dimensioning the flow cross-section of the first throttle 10 as a function of the actuation force as well as of the actuation speed of the brake pedal 1.

The embodiment shown in FIG. 4 differs from the embodiment according to FIG. 1 in that the characteristics modeling means is not connected with the first pressure chamber 7' which is connected with the master cylinder 2, but is arranged in the connection between the reservoir 3' and the second pressure chamber 7". Here, the orientation of the points A and B is reversed in order to take the directional restriction of the valves 12, 13, 14 into consideration. In FIG. 4, the second valve arrangement 6, too, is arranged in this connection between the reservoir 3' and the second pressure chamber 7". Alternatively, the valve arrangement 6 can, however, also remain between the master cylinder 2 and the first pressure chamber 7'. Nothing will thereby be changed in the function achieved according to the invention.

What is claimed is:

1. An actuation unit for an electronically controlled hydraulic vehicle braking system, comprising:
   a brake booster which can be actuated by a brake pedal and which comprises a master cylinder and a reservoir for hydraulic fluid;
   a first brake means which is coupled with at least a first vehicle wheel and which is connectable with the master cylinder via an electronically controlled valve arrangement in a basic position or, in an actuation position, is disconnectable from same;
   a means for the simulation of the brake pedal behavior which is connectable with the master cylinder and comprises a spring arrangement adapted to act against the hydraulic pressure from the master cylinder, characterized in that a characteristics modeling means is associated with the simulation means which influences the behavior of the simulation means as a function of the direction of movement, the actuation force, and the actuation speed of the brake pedal, and which comprises at least one throttle forwarding hydraulic fluid upon actuation of the brake pedal and a second throttle forwarding hydraulic fluid upon release of the brake pedal.

2. The actuation unit according to claim 1, wherein the characteristics modeling means is arranged in the connection between the master cylinder and the means for the simulation of the brake pedal behavior.

3. The actuation unit according to claim 1, wherein the characteristics modeling means is arranged in the connection between the means for the simulation of the brake pedal behavior and a hydraulic reservoir.

4. The actuation unit according to claim 2, wherein a second valve arrangement is arranged in the connection from the master cylinder to the means for the simulation of the brake pedal behavior, by means of which in a basic position the means for the simulation of the brake pedal behavior can be disconnected from the master cylinder or, in an actuation position, can be connected with same.

5. The actuation unit according to claim 3, wherein a second valve arrangement is arranged in the connection from the means for the simulation of the brake pedal behavior to the reservoir, by means of which, in a basic position, the means for the simulation of the brake pedal behavior can be disconnected from the reservoir and, in an actuation position, can be connected with same.

6. The actuation unit according to claim 1, wherein the means for the simulation of the brake pedal behavior is formed by a cylinder and piston arrangement wherein a piston is loaded by a spring arrangement, and the spring arrangement is formed by a helical spring or a diaphragm spring pack arrangement with a preferably progressive spring characteristic.

7. The actuation unit according to claim 1, wherein the spring arrangement is formed by an elastomeric element.

8. The actuation unit according to claim 1, wherein a shut-off valve is arranged one of upstream and downstream of one of the first throttle and the second throttle.

9. The actuation unit according to claim 1, wherein a third throttle is connected in parallel with the first throttle forwarding hydraulic fluid upon the actuation of the brake pedal, with a pressure-controlled differential pressure valve being arranged one of upstream or downstream of the third throttle.

10. The actuation unit according to claim 1, wherein a shut-off valve is arranged upstream of the first throttle.

11. The actuation unit according to claim 1, wherein a shut-off valve is arranged downstream of the first throttle.

12. The actuation unit according to claim 1, wherein a shut-off valve is arranged upstream of the second throttle.

13. The actuation unit according to claim 1, wherein a shut-off valve is arranged downstream of the second throttle.

14. The actuation unit according to claim 1, wherein a shut-off valve is arranged upstream of the first throttle and the second throttle.

15. The actuation unit according to claim 1, wherein a shut-off valve is arranged downstream of the first throttle and the second throttle.

16. An electronically controlled hydraulic vehicle braking system, comprising:
   a brake pedal;
   a master cylinder which can be actuated by the brake pedal;
   a wheel brake which is coupled with at least a first vehicle wheel and which is connectable for fluid communication with the master cylinder;
   an electronically controlled valve for selectively permitting and preventing fluid communication between the wheel brake and the master cylinder;
   a pedal behavior simulator which is connected for fluid communication with the master cylinder, the simulator comprising a spring arranged to act against hydraulic pressure from the master cylinder; and
   a characteristics modeling system which is in fluid communication with the simulator, the characteristics modeling system including at least one throttle, having a first fluid flow characteristic, through which hydraulic fluid flows upon actuation of the brake pedal and a second throttle, having a second fluid flow characteristic different from the first fluid flow characteristic, through which hydraulic fluid flows upon release of the brake pedal.

17. The brake system of claim 16, wherein the simulator comprises:
 a hydraulic cylinder having walls defining a bore therein, the bore having a first end and a second end, the first end of the bore being in fluid communication with the master cylinder;
 a piston slidably disposed in the bore of the cylinder, the piston sealingly engaging the walls of the cylinder to define a first pressure chamber between the piston and the first end of the bore and a second pressure chamber between the piston and the second end of the bore;
 a spring engaging the piston to urge the piston toward the first end of the bore; and
 a fluid reservoir in fluid communication with the second pressure chamber through the characteristics modeling system.

18. The brake system of claim 16, wherein the simulator comprises:
 a hydraulic cylinder having walls defining a bore therein, the bore having a first end and a second end, the first end of the bore being in fluid communication with the master cylinder through the characteristics modeling system;
 a piston slidably disposed in the bore of the cylinder, the piston sealingly engaging the walls of the cylinder to define a pressure chamber between the piston and the first end of the bore; and
 a spring engaging the piston to urge the piston toward the first end of the bore.

19. The brake system of claim 18, the characteristics modeling system further including a differential pressure valve for selectively preventing fluid communication through a portion the characteristics modeling system when a pressure difference between the master cylinder and the pressure chamber of the simulator is less than a preset pressure difference.

20. The brake system of claim 16, the characteristics modeling system further including an electrically operated valve for selectively preventing fluid communication through the characteristics modeling system.

21. A pedal behavior simulator circuit for a vehicle braking system, comprising:
 a brake pedal;
 a master cylinder which can be actuated by the brake pedal;
 a pedal behavior simulator including:
  a body having a cavity defined therein; and
  a movable member sealing against the body to separate the body into a first pressure chamber which is connected for fluid communication with the master cylinder and a second fluid chamber containing a fluid; and
 a fluid circuit in fluid communication with the second fluid chamber for controlling the pressure in the second fluid chamber, wherein a characteristics modeling system is associated with the fluid circuit which influences the behavior of the pedal behavior simulator as a function of the direction of movement, the actuation force, and the actuation speed of the brake pedal, and which comprises at least one throttle forwarding hydraulic fluid upon actuation of the brake pedal and a second throttle forwarding hydraulic fluid upon release of the brake pedal.

22. The pedal behavior simulator circuit according to claim 21, further including a valve for selectively preventing fluid communication through the characteristics modeling system.

\* \* \* \* \*